(12) United States Patent
Aoyama et al.

(10) Patent No.: US 11,416,552 B2
(45) Date of Patent: Aug. 16, 2022

(54) GRAPH UPDATING APPARATUS, GRAPH UPDATING METHOD AND PROGRAM

(71) Applicant: NIPPON TELEGRAPH AND TELEPHONE CORPORATION, Tokyo (JP)

(72) Inventors: Kazuo Aoyama, Tokyo (JP); Takashi Hattori, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 92 days.

(21) Appl. No.: 17/053,751

(22) PCT Filed: May 8, 2019

(86) PCT No.: PCT/JP2019/018411
§ 371 (c)(1),
(2) Date: Nov. 6, 2020

(87) PCT Pub. No.: WO2019/216346
PCT Pub. Date: Nov. 14, 2019

(65) Prior Publication Data
US 2021/0157851 A1 May 27, 2021

(30) Foreign Application Priority Data

May 10, 2018 (JP) .............................. JP2018-091773

(51) Int. Cl.
*G06F 16/906* (2019.01)
*G06N 20/00* (2019.01)
(Continued)

(52) U.S. Cl.
CPC ........ *G06F 16/9024* (2019.01); *G06F 16/906* (2019.01); *G06F 16/90335* (2019.01); *G06K 9/6256* (2013.01); *G06N 20/00* (2019.01)

(58) Field of Classification Search
CPC .......................... G06F 16/9024; G06F 16/2246
See application file for complete search history.

(56) References Cited

U.S. PATENT DOCUMENTS

| 10,409,782 B2* | 9/2019 | Zhang ................. G06F 16/9024 |
| 2014/0019490 A1* | 1/2014 | Roy ..................... G06F 16/9024 707/798 |

(Continued)

FOREIGN PATENT DOCUMENTS

| JP | 4774016 B2 | 7/2011 |
| JP | 4774019 B2 | 7/2011 |

OTHER PUBLICATIONS

Aoyama et al. (2009) "Fast Similarity Search in Small-World Networks," Int. Workshop Complex Networks(CompleNet 2009) pp. 185-196.

(Continued)

*Primary Examiner* — Robert W Beausoliel, Jr.
*Assistant Examiner* — Pedro J Santos

(57) ABSTRACT

A graph updating device includes: a K neighbor vertex search unit that searches for a K neighbor vertex set of an added vertex in a neighbor graph on the basis of the neighbor graph and an object added to the neighbor graph as an added vertex and outputs the K neighbor vertex set; a vertex selection unit that selects a vertex candidate set on the basis of the neighbor graph, the added vertex, and the K neighbor vertex set of the added vertex and outputs the vertex candidate set, the vertex candidate set being a set of vertices that is present in the neighbor graph and possibly contains the added vertex in a K neighbor vertex set thereof; and a neighbor graph updating unit that reconstructs a K neighbor vertex set related to all vertices of the neighbor graph using K neighbor vertex sets of respective vertices of the vertex candidate set and adds the K neighbor vertex set of the added vertex to the reconstructed K neighbor vertex set to generate an updated neighbor graph.

20 Claims, 12 Drawing Sheets

(51) Int. Cl.
*G06F 16/901* (2019.01)
*G06F 16/903* (2019.01)
*G06K 9/62* (2022.01)

(56) References Cited

U.S. PATENT DOCUMENTS

| | | | |
|---|---|---|---|
| 2019/0042613 A1* | 2/2019 | Eyerman | G06F 16/9024 |
| 2019/0121810 A1* | 4/2019 | Zhuang | G06F 16/213 |
| 2020/0012636 A1* | 1/2020 | Burtscher | G06N 5/022 |
| 2021/0182316 A1* | 6/2021 | Haprian | G06F 16/242 |
| 2021/0286790 A1* | 9/2021 | Lozi | G06F 17/10 |

OTHER PUBLICATIONS

Aoyama et al. (2011) "Fast Approximate Similarity Search Based on Degree-Reduced Neighborhood Graphs," ACM SIGKDD Conf. Knowledge Discovery and Data Mining, Aug. 21, 2011, pp. 1055-1063.

Aoyama et al. (2013) "Graph Index Based Query-by-Example Search on a Large Speech Data Set," ICASSP, May 26, 2013, pp. 8520-8524.

Dong et al. (2011) "Efficient K-Nearest Neighbor Graph Construction for Generic Similarity Measures," WWW '11: Proceedings of the 20th international conference on World Wide Web, pp. 577-586.

\* cited by examiner

GRAPH UPDATING APPARATUS, GRAPH UPDATING METHOD AND PROGRAM

CROSS-REFERENCE TO RELATED APPLICATIONS

This application is a U.S. 371 Application of International Patent Application No. PCT/JP2019/018411, filed on 8 May 2019, which application claims priority to and the benefit of JP Application No. 2018-091773, filed on 10 May 2018, the disclosures of which are hereby incorporated herein by reference in their entireties.

TECHNICAL FIELD

The present invention relates to a technology for updating a neighbor graph used in a field such as machine learning and a search algorithm.

BACKGROUND ART

Neighbor graphs have various modes and have been applied in various fields according to the modes. In typical neighbor graphs, points in an object or a space are regarded as vertices, and an edge is provided between two vertices based on the density or the distance of the relationship between the two vertices. Particularly, the relationship is defined as similarity or a distance (or dissimilarity) from a certain vertex, a K-nearest neighbor graph (K-NN graph) in which edges are provided between the K nearest or similar vertices on the basis of the similarity or the distance (dissimilarity), a Delaunay triangulation (DT) that is a duality of a Voronoi diagram, a relative neighborhood graph (RNG) that is a partial graph of the DT, a β skeleton graph that is a generalized graph of the RNG, and a minimum spanning tree (MST) that is a partial graph of the RNG are used in pattern recognition or a search.

With attention paid to a search method, there has been proposed a graph index type search method in which a K-nearest neighbor graph or its partial graph, i.e., a degree-reduced k-nearest neighbor graph (K-DR graph) is used for a search index to perform a fast search (Non-Patent Literature 1). Further, a search method using a graph index includes an approximate search method (Non-Patent Literature 2) or a heuristic method (Patent Literatures 1 and 2 and Non-Patent Literatures 1 and 3) and has realized a fast search with respect to various media.

The graph index type search method is fast during a search but requires a huge calculated amount during the construction of an index. For example, when an exact K-nearest neighbor graph is constructed according the simplest method with respect to an object set having n search target objects (vertices), time complexity of $O(n^2)$ is required to calculate dissimilarity. In order to reduce the calculation load, there has been proposed a heuristic method in which an approximate K-nearest neighbor graph is constructed (Non-Patent Literature 4). These methods are methods in which a K-nearest neighbor graph is constructed in a lump with respect to a given search target object set (vertex set).

CITATION LIST

Patent Literature

[PTL 1] Japanese Patent No. 4774016
[PTL 2] Japanese Patent No. 4774019

Non Patent Literature

[NPL 1] K. Aoyama, K. Saito, T. Yamada, and N. Ueda, "Fast similarity search in small-world networks," Int. Workshop Complex Networks (CompleNet 2009), pp. 185-196, 2009.
[NPL 2] K. Aoyama, K. Saito, H. Sawada, and N. Ueda, "Fast approximate similarity search based on degree-reduced neighborhood graphs," ACM SIGKDD Conf. Knowledge Discovery and Data Mining, 2011.
[NPL 3] K. Aoyama, A. Ogawa, T. Hattori, T. Hori, and A. Nakamura, "Graph index based query-by-example search on a large speech data set" Proc. Int. Conf. Acoustics, Speech, and Signal Processing (ICASSP), pp. 8520-8524, 2013.
[NPL 4] W. Dong, M. Charikar, and K. Li, "Efficient K-nearest neighbor graph construction for generic similarity measures," Int. World Wide Web Conf., 2011.

SUMMARY OF THE INVENTION

Technical Problem

There has been a problem that, when a new object (vertex) is added to a constructed K-nearest neighbor graph, a huge calculated amount is required since n+1 objects are required to be processed in a lump. That is, an online processing method or a sequential processing method for adding one new object (vertex) has been demanded.

Hereinafter, an exact or approximate K-nearest neighbor graph and a graph having a structure similar to that of the exact or approximate K-nearest neighbor graph will be called neighbor graphs, and the terms of an object and a vertex will be used without being distinguished from each other unless otherwise particularly specified. That is, an object and a vertex are identified as being the same. Further, a neighbor graph in which edges are provided between respective vertices and K vertices as well as an exact K-nearest neighbor graph and an approximate K-nearest neighbor graph will be generally called a K neighbor graph.

The present invention has been made in view of the above circumstances and has an object of reducing time complexity required to add a new vertex to a neighbor graph.

Means for Solving the Problem

According to a disclosed technology, there is provided a graph updating device including: a K neighbor vertex search unit that searches for a K neighbor vertex set of an added vertex in a neighbor graph on the basis of the neighbor graph and an object added to the neighbor graph as an added vertex and outputs the K neighbor vertex set; a vertex selection unit that selects a vertex candidate set on the basis of the neighbor graph, the added vertex, and the K neighbor vertex set of the added vertex and outputs the vertex candidate set, the vertex candidate set being a set of vertices that is present in the neighbor graph and possibly contains the added vertex in a K neighbor vertex set thereof; and a neighbor graph updating unit that reconstructs a K neighbor vertex set related to all vertices of the neighbor graph using K neighbor vertex sets of respective vertices of the vertex candidate set and adds the K neighbor vertex set of the added vertex to the reconstructed K neighbor vertex set to generate an updated neighbor graph.

Effects of the Invention

With a disclosed technology, it is possible to reduce time complexity required to add a new vertex to a neighbor graph.

DESCRIPTION OF EMBODIMENTS

Hereinafter, an embodiment of the present invention (present embodiment) will be described in detail with reference to the drawings. The following embodiment is only an example, and an embodiment to which the present invention is applied is not limited to the following embodiment.

(System Configuration and Operation Outline)

Figure 1:
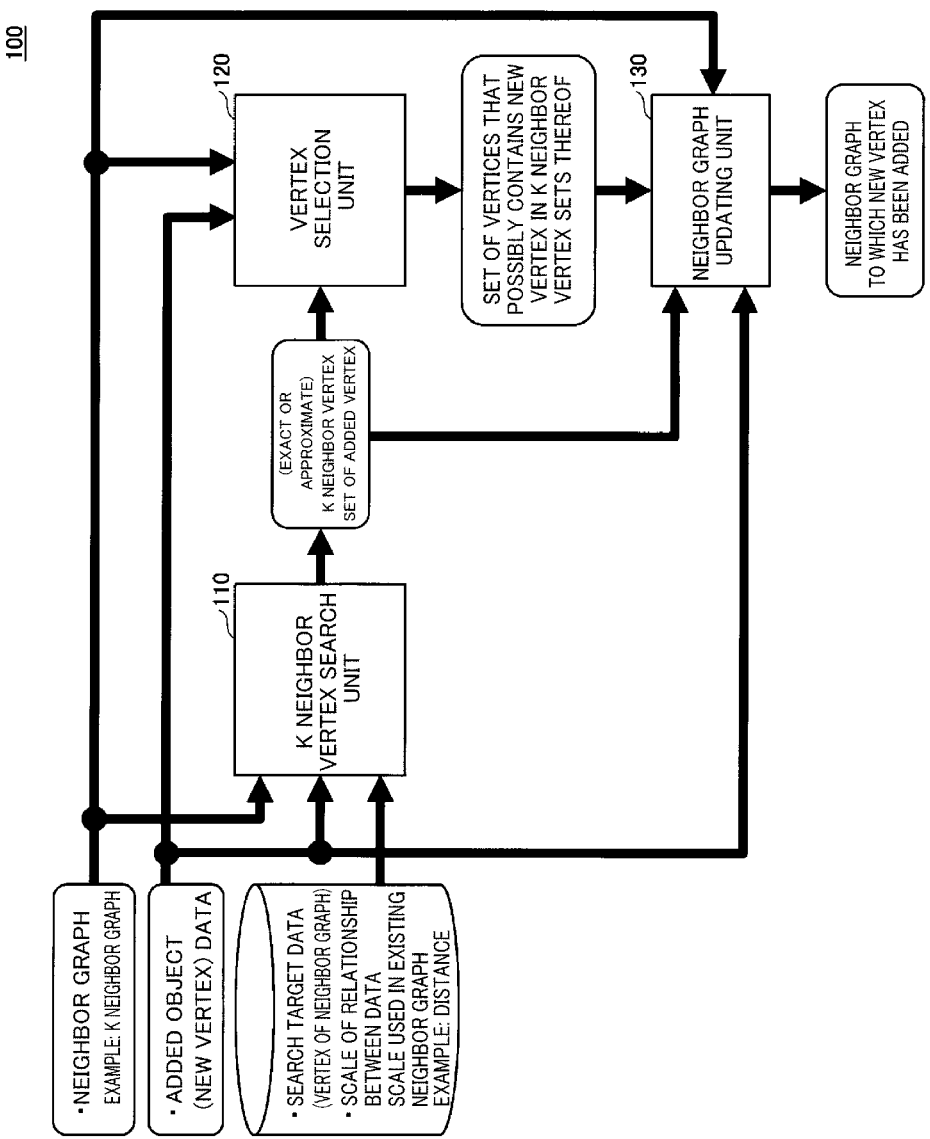
FIG. 1 is a configuration diagram of a neighbor graph updating device 100.

FIG. 1 is a configuration diagram of a neighbor graph updating device 100 in the present embodiment. The configuration and the operation outline of the neighbor graph updating device 100 will be described with reference to FIG. 1.

As shown in FIG. 1, the neighbor graph updating device 100 includes a K neighbor vertex search unit 110, a vertex selection unit 120, and a neighbor graph updating unit 130 as its main constituting elements. The operation outlines of the respective units of the neighbor graph updating device 100 are as follows.

The K neighbor vertex search unit 110 receives the input of a neighbor graph (here, a K neighbor graph), an added object (corresponding to a new vertex added to the K neighbor graph), or the like. The K neighbor vertex search unit 110 regards a new vertex as a query for a search and performs a graph index type search using a K neighbor graph to which the vertex is added as a graph index to find out K neighbor vertices of the added vertex from the K neighbor graph. For example, the K neighbor vertex search unit 110 finds out a set of the K vertices nearest to an added vertex (a subset of the vertices of a graph that is an index).

The vertex selection unit 120 selects vertices that possibly become closer to an added vertex than the K-th nearest neighbor vertex at the present moment from among all the n vertices. The vertex selection unit 120 uses a filter to avoid calculating the distances between the added vertex and each of the n vertices. By using the filter, the vertex selection unit 120 performs the calculation of only the distances between the added vertex and m (<n) vertices to reduce time complexity. The filter is, for example, a filter that excludes a vertex that does not regard an added vertex as its K neighbor vertex from a set of all the vertices of an input K neighbor graph. Here, the operation of the filter that "excludes a vertex that does not regard an added vertex as its K neighbor vertex" may include exact exclusion in which only a vertex that does not regard an added vertex as its K neighbor vertex or approximate exclusion in which an excluded vertex contains, besides a vertex that does not regard an added vertex as its K neighbor vertex, a vertex that regards an added vertex as its K neighbor vertex. As described above, by excluding a vertex that does not regard an added vertex as its K neighbor vertex, it is possible to reduce the number of vertices that are targeted to perform calculation of distances to the added vertex and reduce time complexity at the time of generating a neighbor graph to which the vertex has been added.

The neighbor graph updating unit 130 generates and outputs a neighbor graph to which a new vertex has been added by using a vertex set selected by the vertex selection unit 120 or the like. The neighbor graph is, for example, an approximate degree-reduced K-nearest neighbor graph (approximate K-DR graph).

(Hardware Configuration)

The neighbor graph updating device 100 described above is realizable by causing a device such as a computer to perform a program in which a processing content described in the present embodiment is described. That is, the function of the neighbor graph updating device 100 is realizable in such a manner that a program corresponding to processing performed by the neighbor graph updating device 100 is performed using a hardware resource such as a CPU and a memory included in a computer. The above program may be stored or distributed in a state of being recorded on a computer-readable recording medium (portable memory or the like). Further, the above program may be provided via a network such as the Internet or an e-mail.

Figure 2:
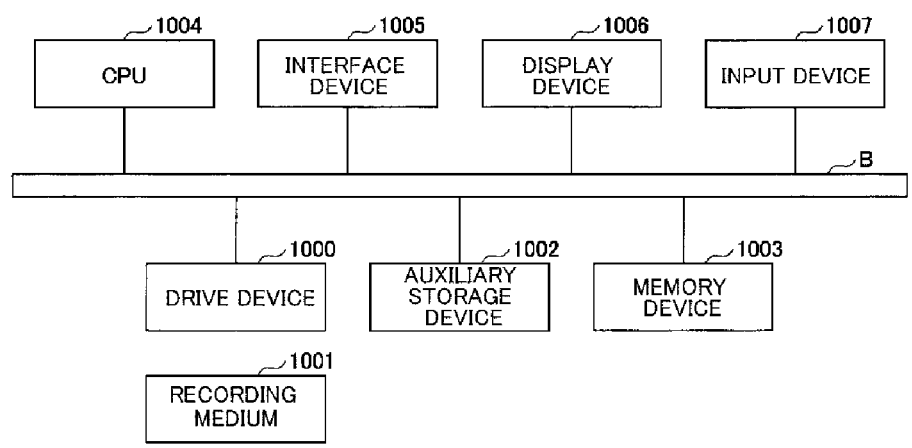
FIG. 2 is a hardware configuration diagram of the neighbor graph updating device 100.

FIG. 2 is a diagram showing a hardware configuration example of the neighbor graph updating device 100. The neighbor graph updating device 100 of FIG. 2 has a drive device 1000, an auxiliary storage device 1002, a memory device 1003, a CPU 1004, an interface device 1005, a display device 1006, an input device 1007, and the like, all of which are connected to one another via a bus B. Note that the display device 1006 and the input device 1007 may not be provided.

A program that realizes processing in the neighbor graph updating device 100 is provided by, for example, a recording medium 1001 such as a CD-ROM and a memory card. When the recording medium 1001 storing the program is set in the drive device 1000, the program is installed in the auxiliary storage device 1002 via the drive device 1000 from the recording medium 1001. However, the program is not necessarily required to be installed from the recording medium 1001 but may be downloaded from other computers via a network. The auxiliary storage device 1002 stores necessary files, data, or the like, besides the installed program.

Upon receiving instructions to start the program, the memory device 1003 reads the program from the auxiliary storage device 1002 and stores the same. The CPU 1004 realizes a function related to the neighbor graph updating device 100 according to the program stored in the memory device 1003. The interface device 1005 is used as an interface for establishing connection with a network. The display device 1006 displays a GUI (Graphical User Interface) or the like according to the program. The input device 1007 is constituted by a keyboard, a mouse, a button, a touch panel, or the like and used to input various operating instructions.

Hereinafter, the processing operation of the neighbor graph updating device 100 shown in FIG. 1 will be described in further detail.

(Input Data to Neighbor Graph Updating Device 100)

The following data 1) to 3) is input to the neighbor graph updating device 100.

1) An updated neighbor graph G=(V, E) where V expresses a vertex set and E express an edge set. Further, in the case of the K neighbor graph, the value of K is necessarily contained as data.

2) Object data corresponding to a vertex added to the neighbor graph. Note that the object data may be simply called an "object".

3) The scale of the relationships between objects corresponding to vertices constituting above the neighbor graph and objects used to generate edges. Examples of the scales of the relationships between the objects include a distance such as a Euclidean distance and a Manhattan distance, dissimilarity as represented by Kullback-Leibler divergence, and similarity such as cosine similarity.

As input data, the neighbor graph and the added object are necessary. The object is also called a "query vertex" in the neighbor graph. Since the objects in 3) can be contained in the neighbor graph in 1), the input of 1) and 3) can be combined together as the neighbor graph. In the following description, a case in which the distance is selected as the scale of the relationship between two objects (vertices) is used as an example. However, in order to generalize the dissimilarity or the like, an example of introducing a scaling factor will also be described.

Note that since a processing content described in the present embodiment is basically the same without depending on the scale of a relationship, a "distance" in the present specification and claims may be interpreted as a generic term of the scales of the various relationships described above.

(Output from Neighbor Graph Updating Device 100)

On the basis of input data in 1) to 3), the neighbor graph updating device 100 outputs a neighbor graph updated by containing an added vertex in 2).

(Details of Operation of Neighbor Graph Updating Device 100)

As shown in FIG. 1, the neighbor graph updating device 100 includes the K neighbor vertex search unit 110, the vertex selection unit 120, and the neighbor graph updating unit 130.

Using the three types of data described above as input, the K neighbor vertex search unit 110 outputs a K neighbor vertex set of an added vertex ($v_q$). That is, the K neighbor vertex search unit 110 searches for K vertices in ascending order of distance from the vertex nearest to $v_q$ in a neighbor graph and outputs a K neighbor vertex set that is a set of the searched K vertices.

Using a neighbor graph in 1), an added vertex in 2), and a K neighbor vertex set of the added vertex that is the output of the K neighbor vertex search unit 110 as input, the vertex selection unit 120 selects vertices having a K neighbor vertex set that is possibly corrected from all the vertices of the neighbor graph and outputs a set of the selected vertices. In other words, a set of vertices having a K neighbor vertex set that is possibly corrected can be called a set of vertices having a K neighbor vertex set that possibly contains a new vertex (=an added vertex).

Using a neighbor graph in 1), an added vertex in 2), a K neighbor vertex set of the added vertex that is the output of the K neighbor vertex search unit 110, and a set of selected vertices that is the output of the vertex selection unit 120 as input, the neighbor graph updating unit 130 generates and outputs a neighbor graph to which the new vertex has been added.

Hereinafter, an example of the processing operation of the respective constituting units will be described in further detail.

<K Neighbor Vertex Search Unit 110>

As shown in FIG. 1, the K neighbor vertex search unit 110 receives the input of data 1) to 3) described above. The K neighbor vertex search unit 110 searches for K neighbor vertices of an added vertex using, for example, a graph index type similarity search method. That is, when using the graph index type similarity search method, the K neighbor vertex search unit 110 regards an added vertex as a query for a search and performs a graph index type search using a K neighbor graph to which the vertex is added as a graph index. As a search algorithm, a fast graph search algorithm such as (a) a Best-first search (abbreviated as BS) described in Non-Patent Literature 1 and (b) a Multi-start greedy search (abbreviated as MSGS) described in Non-Patent Literature 2 can be, for example, used.

The BS of (a) is a search method in which a greedy search (a method in which a search is repeatedly performed using the vertex nearest to a query vertex among neighbor vertices of a current vertex as a next current vertex and is ended when a current vertex becomes nearest to the query vertex) is performed from a given initial vertex, and a vertex that has neighbor vertices of which the distance to the query has not been calculated and that is the second-nearest to the query vertex after a current vertex among vertices of which the distance to the query vertex has been calculated is set as a next current vertex when the greedy search is ended. The method ends when a preset calculation cost is reached.

On the other hand, the MSGS of (b) uses parallel processing, starts a greedy search from a plurality of preset initial vertices, ends when the greedy search is ended, and regards K vertices from the nearest vertex in ascending order of distance as K neighbor vertices with respect to the union of the sets of vertex sets close to a query vertex found in each of a plurality of search paths. Further, in the MSGS, a Breadth-first search (BFS) may be performed from vertices that have ended the greedy search on the basis of preset ending conditions using a vertex at an end time as a start point. The ending conditions of the BFS include a calculation cost, a search depth, K neighbor vertex set invariance, or the like.

Note that the graph index type similarity search method described here is a heuristic method or an approximate search method and therefore the accuracy of a calculated solution (K neighbor vertex set) depends on time complexity (for example, a distance calculation cost). For example, when a calculation cost is set at n (the number of the vertices of a neighbor graph) in the BS, an exact K neighbor vertex set can be obtained in agreement with exhaustive searches (a linear scan method, a brute-force method).

<Vertex Selection Unit 120>

Next, the input/output and the processing content of the vertex selection unit 120 will be described. As shown in FIG. 1, the vertex selection unit 120 receives the input of a K neighbor graph, an added new vertex ($v_q$), and a K neighbor vertex set of the new vertex ($v_q$) that is the output of the K neighbor vertex search unit 110. By performing a procedure along the flowchart of FIG. 3 on the basis of the input data, the vertex selection unit 120 selects a vertex ($v_x$) in which the new vertex ($v_q$) possibly becomes its K neighbor (K neighbor vertex candidate) from among vertices that are the elements of a vertex set (V, |V|=n) of the input K neighbor graph ($v_x \in v$).

Figure 3:
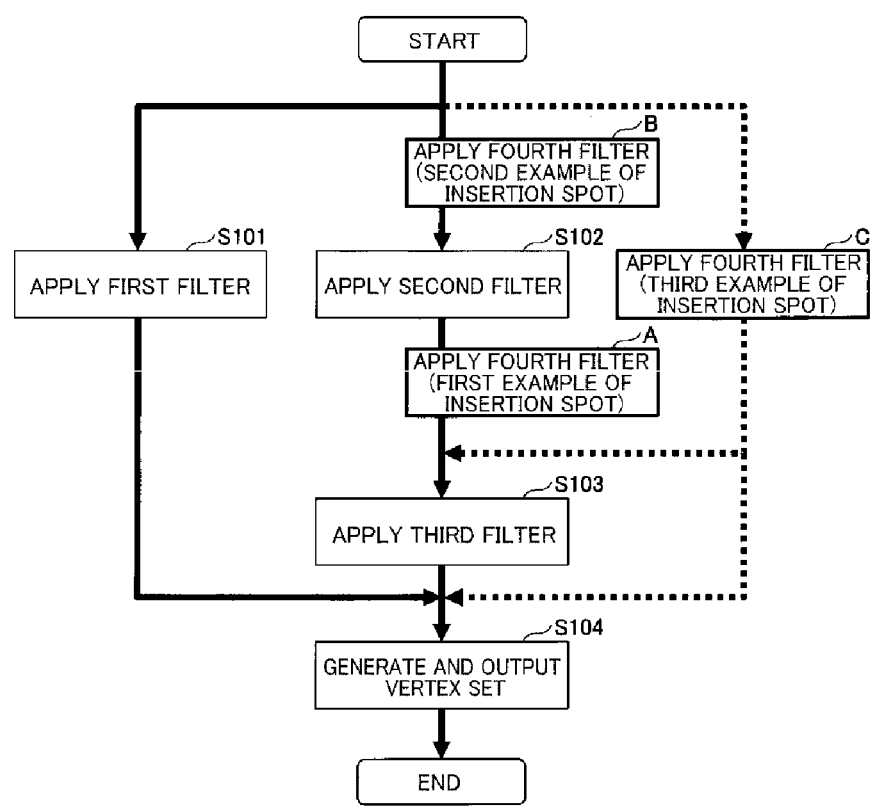
FIG. 3 is a flowchart for describing an operation example of a vertex selection unit 120.

Note that as shown in FIG. 3, a fourth filter is applied at any of spots A, B, and C shown as insertion spot examples 1 to 3. Further, the fourth filter may not be used. Further, the use of the first to fourth filters here is an example. One, two, or three of the filters may be applied, or another filter may be applied, besides the first to fourth filters.

In S101 of FIG. 3, the vertex selection unit 120 applies the first filter. Here, the vertex selection unit 120 excludes from candidates of a vertex ($v_x$) which is an element ($v_x \in B_q$) of a K neighbor vertex set ($B_q$) of a new vertex ($v_q$), a distance (max_dist) to the K-th neighbor vertex of the vertex ($v_x$) itself being smaller than a distance (dist ($v_q$, $v_x$)) between $v_q$ and $v_x$.

Figure 4:
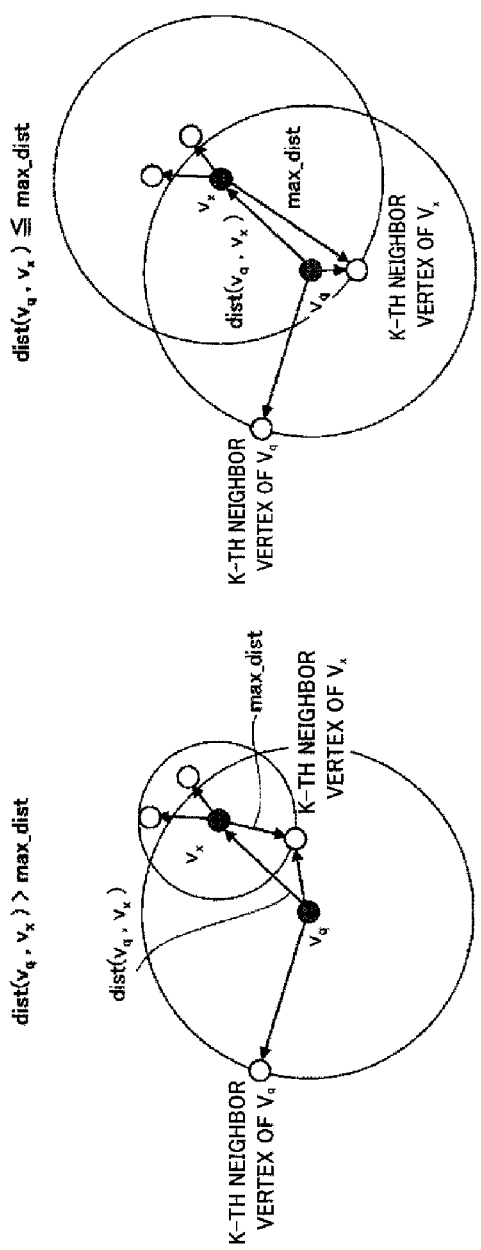
FIGS. 4(a) and 4(b) are diagrams for describing a first filter.

A specific example of the application of the first filter is shown in FIGS. 4(*a*) and 4(*b*). FIG. 4(*a*) shows an example of a case in which a vertex ($v_x$) is excluded from vertex candidates by the first filter. About the vertex ($v_x$) shown in FIG. 4(*a*), a distance dist($v_q$, $v_x$) is greater than a distance (max_dist) between the vertex ($v_x$) and the K-th neighbor vertex of the vertex ($v_x$) itself as shown in the figure. Accordingly, the vertex ($v_x$) is excluded from the selection candidates. This is because the new vertex ($v_q$) cannot be a K neighbor vertex of the vertex ($v_x$) in this case.

FIG. 4(*b*) shows an example of a case in which a vertex ($v_x$) passes through the first filter. As shown in the figure, a distance dist($v_g$, $v_x$) is smaller than a distance (max_dist) between the vertex ($v_x$) and the K-th neighbor vertex of the vertex ($v_x$) itself. Accordingly, the vertex ($v_x$) passes through the first filter.

When a distance space is defined, that is, when the relationship between vertices satisfies a distance axiom, the first filter is based on the fact that $v_q$ is not a K neighbor vertex of $v_x$ if dist($v_q$, $v_x$)>max_dist is established.

In S102 of FIG. 3, the vertex selection unit 120 applies the second filter. Here, the vertex selection unit 120 excludes a vertex ($v_x$) in which the intersection of the K neighbor vertex set ($B_q$) of the new vertex ($v_q$) and a K neighbor vertex set ($B_x$) of the vertex ($v_x$) itself is an empty set ($B_q \cap B_x$=empty set) from the selection candidates.

Figure 5:
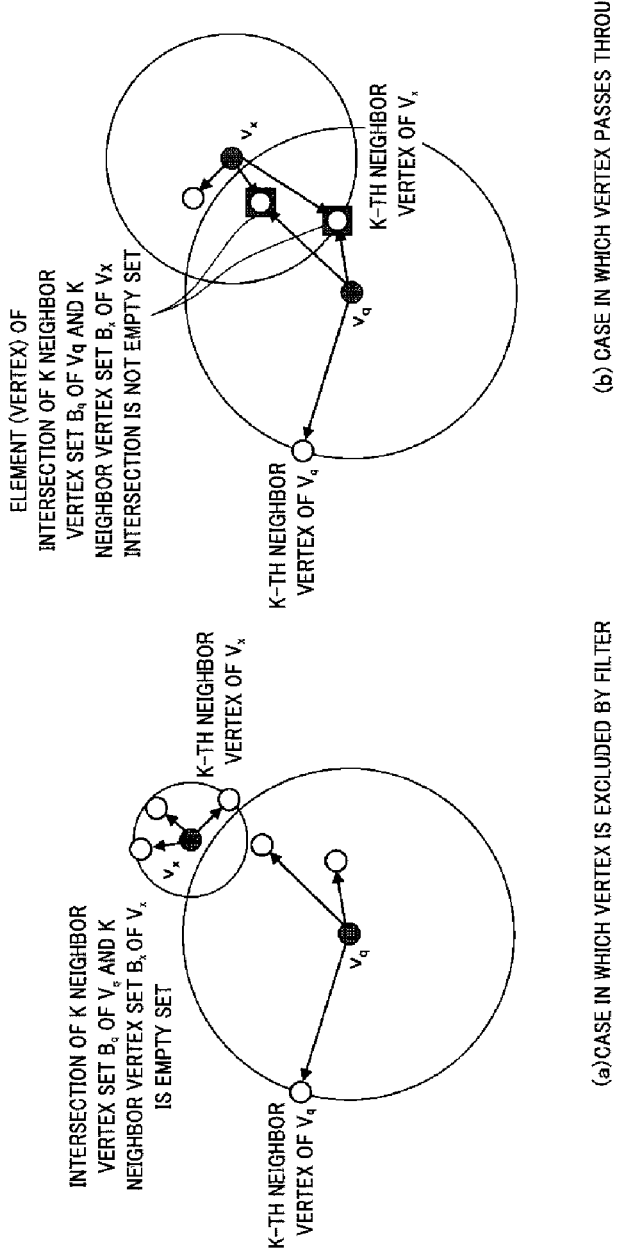
FIGS. 5(a) and 5(b) are diagrams for describing a second filter.

A specific example of the application of the second filter is shown in FIGS. 5(*a*) and 5(*b*). FIG. 5(*a*) shows an example of a case in which a vertex ($v_x$) is excluded from vertex candidates. As shown in the figure, the intersection of a K neighbor vertex set ($B_q$) of a new vertex ($v_q$) and a K neighbor vertex set ($B_x$) of the vertex ($v_x$) is empty. Accordingly, the vertex ($v_x$) is excluded from the vertex candidates by the second filter.

FIG. 5(*b*) shows an example of a case in which a vertex ($v_x$) passes through the second filter. As shown in the figure, the intersection of a K neighbor vertex set ($B_q$) of a new vertex ($v_q$) and a K neighbor vertex set ($b_x$) of the vertex ($v_x$) is not an empty set in this case, and two vertices are provided in this example. Accordingly, the vertex ($v_x$) is not excluded from selection candidates. However, in the case of the example of FIG. 5(*b*), the new vertex ($v_q$) is not a K neighbor vertex of the vertex ($v_x$) although the vertex ($v_x$) passes through the second filter.

An application method for the second filter is a heuristic method using the idea "A neighbor of a neighbor is also likely to be a neighbor." According to the application method, there is a case that, even if a vertex is excluded by the second filter depending on a data distribution, a vertex $v_q$ might be a K neighbor vertex of a vertex $v_x$ when the calculation is exactly performed.

In S103 of FIG. 3, the vertex selection unit 120 applies the third filter. Note that the third filter is applied after the second filter. Accordingly, about a vertex ($v_x$) that becomes a target determined by the third filter, the intersection of the K neighbor vertex set ($B_q$) of the new vertex ($v_q$) and a K neighbor vertex set ($B_x$) of a vertex ($v_x$) is not an empty set.

Here, the vertex selection unit 120 excludes from the candidates of a vertex ($v_x$) which is not an element of the K neighbor vertex set ($B_q$) of the new vertex ($v_q$) and a distance (max_dist) to the K-th neighbor vertex of the vertex ($v_x$) itself being smaller than or equal to a lower limit value (LB($v_q$, $v_x$)) of the distance between the vertex ($v_q$) and the vertex ($v_x$).

The lower limit value (LB($v_q$, $v_x$)) of the distance between the vertex ($v_q$) and the vertex ($v_x$) is, when the intersection of the K neighbor vertex set ($B_q$) of the vertex ($v_q$) and the K neighbor vertex set ($B_x$) of the vertex ($v_x$) has a plurality of vertices, the value of | (the distance between a vertex and the vertex ($v_q$)–(the distance between the vertex and the vertex ($v_x$))| of the vertex among the plurality of vertices in which|(the distance between the vertex and the vertex ($v_q$)–(the distance between the vertex and the vertex ($v_x$))| becomes maximum. When the intersection of the K neighbor vertex set ($B_q$) of the vertex ($v_q$) and the K neighbor vertex set ($B_x$) of the vertex ($v_x$) has one vertex, the value of |(the distance between the vertex and the vertex ($v_q$)–(the distance between the vertex and the vertex ($v_x$))| of the vertex becomes the lower limit value (LB($v_q$, $v_x$)).

Note that, when the intersection of the K neighbor vertex set ($B_q$) of the vertex ($v_q$) and the K neighbor vertex set ($B_x$) of the vertex ($v_x$) has a plurality of vertices, setting the value of |(the distance between a vertex and the vertex ($v_q$)–(the distance between the vertex and the vertex ($v_x$))| of the vertex in which the value of |(the distance between the vertex and the vertex ($v_q$)–(the distance between the vertex and the vertex ($v_x$))| becomes maximum as (LB($v_q$, $v_x$) is an example. For example, when the intersection of the K neighbor vertex set ($B_q$) of the vertex ($v_q$) and the K neighbor vertex set ($B_x$) of the vertex ($v_x$) has a plurality of vertices, the value of |(the distance between a vertex and the vertex ($v_q$)–(the distance between the vertex and the vertex ($v_x$))| of any of the plurality of vertices may be set as (LB($v_q$, $v_x$).

Figure 6:
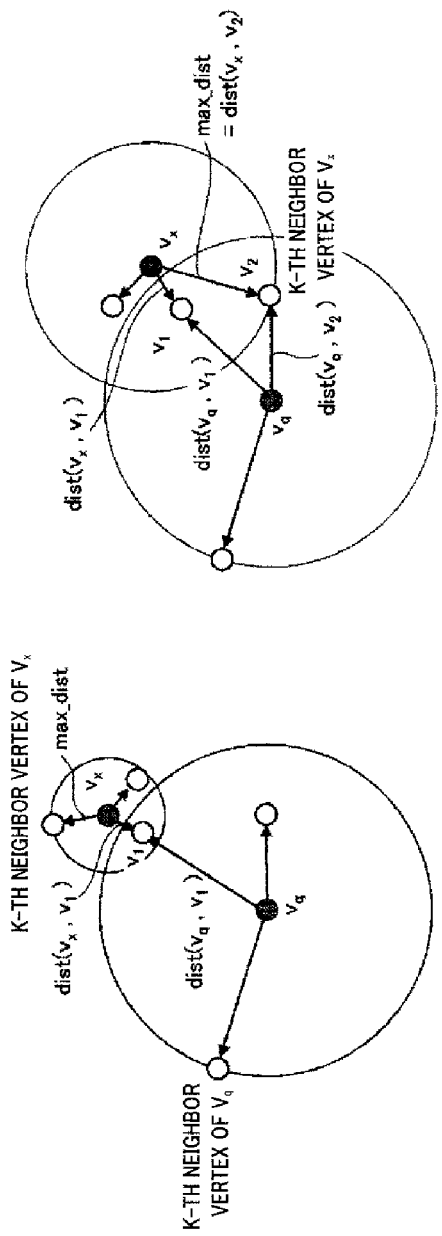
FIGS. 6(a) and 6(b) are diagrams for describing a third filter.

A specific example of the application of the third filter is shown in FIGS. 6(*a*) and 6(*b*). FIG. 6(*a*) shows an example of a case in which a vertex ($v_x$) is excluded from vertex candidates by the third filter. About the vertex ($v_x$) shown in FIG. 6(*a*), LB($v_q$, $v_x$)=|dist($v_q$, $v_l$)–dist($v_x$, $v_l$)| is greater than max_dist as shown in the figure. Therefore, the vertex ($v_x$) is excluded from the selection candidates.

FIG. 6(*b*) shows an example of a case in which a vertex ($v_x$) passes through the third filter. About the vertex ($v_x$) shown in FIG. 6*ba*), LB($v_q$, $v_x$)=max$_{J=1,2}${|dist($v_q$, $v_j$)–dist ($v_x$, $v_j$)|} (in the example of FIG. 6(*b*), LB($v_q$, $v_x$)=|dist($v_q$, $v_l$)–dist($v_x$, $v_l$)|) is smaller than max_dist. Therefore, the vertex ($v_x$) passes through the third filter. Note that FIG. 6(*b*) shows an example in which $v_q$ is not a K neighbor vertex of $v_x$ although the vertex ($v_x$) passes through the third filter.

When a distance space is defined, that is, when the relationship between vertices satisfies a distance axiom, the third filter is based on the fact that $v_q$ is not a K neighbor vertex of $v_x$ if LB($v_q$, $v_x$)>max_dist is established.

The vertex selection unit 120 may apply the fourth filter at any of the spots A, B, and C of FIG. 3. In applying the fourth filter, the vertex selection unit 120 does not select a target vertex ($v_x$) when the target vertex ($v_x$) is positioned on the outside of the K neighbor of the added vertex ($v_q$) and the K neighbor sphere radius of the target vertex ($v_x$) is smaller than the distance (K neighbor sphere radius) between the added vertex ($v_q$) and the K-th neighbor vertex. That is, a target vertex ($v_x$) corresponding to the above case is excluded by the filter. The difference between the fourth filter and the third filter is that the fourth filter does not depend on the presence or absence of a vertex contained in an intersection and makes a determination on the basis of the magnitude of the radius of a sphere instead of the lower limit value of a distance.

Figure 7:
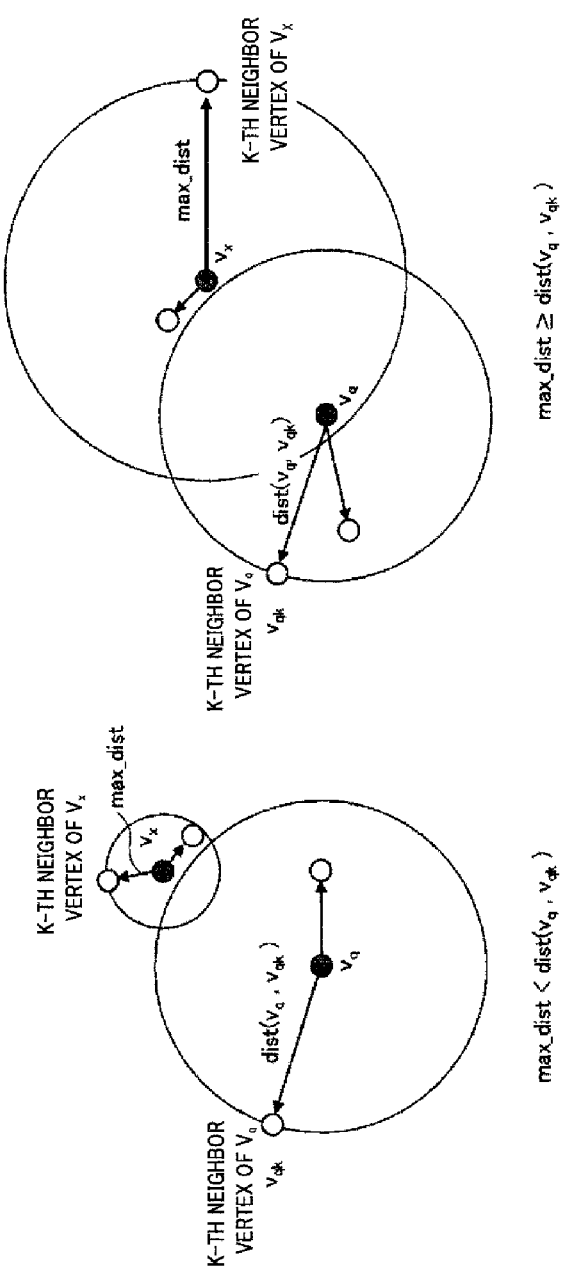
FIGS. 7(a) and 7(b) are diagrams for describing a fourth filter.

A specific example of the application of the fourth filter is shown in FIGS. 7(a) and 7(b). FIG. 7(a) shows an example of a case in which a vertex ($v_x$) is excluded from vertex candidates by the fourth filter. As shown in FIG. 7(a), a K neighbor sphere radius ($dist(v_q, v_{gk})$) of an added vertex ($v_q$) is greater than the K neighbor sphere radius of the target vertex ($v_x$). Accordingly, the vertex ($v_x$) is excluded from the selection candidates.

FIG. 7(b) shows an example of a case in which a vertex ($v_x$) passes through the fourth filter. As shown in FIG. 7(b), the K neighbor sphere radius ($dist(v_q, v_{gk})$) of an added vertex ($v_q$) is smaller than the K neighbor sphere radius of the added vertex ($v_x$). Accordingly, the vertex ($v_x$) passes through the fourth filter.

The vertex ($v_x$) having passed through the first filter is added to a vertex set in S104 of FIG. 3 since the exact distance ($dist(v_q, v_x)$) between $v_q$ and $v_x$ has been calculated and the vertex ($v_x$) is an element of the K neighbor vertex set of the added vertex ($v_q$). On the other hand, it is not certain whether each of the vertices ($v_x$) having passed through the second, third, and fourth filters is a K neighbor of the added vertex ($v_q$) in a strict sense. Accordingly, in S104 of FIG. 3, the vertex selection unit 120 calculates the exact distances between the vertex ($v_x$) having passed through the second and third filters (or the second, third, and fourth filters) and the newly-added vertex ($v_q$), selects the vertices ($v_x$) if the new vertex ($v_q$) falls within the distance of the K neighbor of the vertices ($v_x$) themselves, and adds the vertices ($v_x$) to the vertex set as the selected vertices.

<Neighbor Graph Updating Unit 130>

Next, the input/output and the processing content of the neighbor graph updating unit 130 will be described. As shown in FIG. 1, the neighbor graph updating unit 130 receives the input of a neighbor graph (K neighbor graph), an added new vertex, a K neighbor vertex set of the new vertex that is the output of the K neighbor vertex search unit 110, and a set of vertices having a K neighbor vertex set that possibly contains the new vertex that is the output of the vertex selection unit 120. By performing a procedure along the flowchart of FIG. 8 on the basis of the input data, the neighbor graph updating unit 130 generates and outputs a neighbor graph to which the new vertex has been added.

Figure 8:
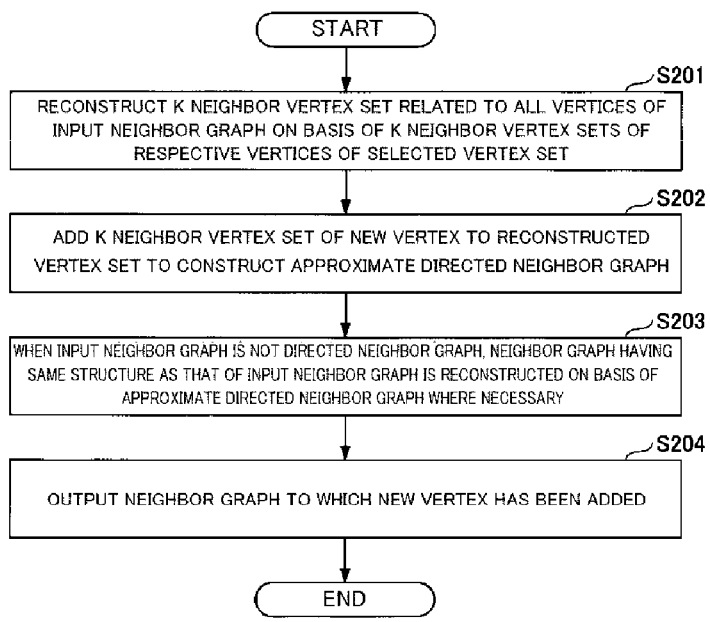
FIG. 8 is a flowchart for describing an operation example of a neighbor graph updating unit 130.

In S201 of FIG. 8, the neighbor graph updating unit 130 reconstructs a k neighbor vertex set related to all the vertices of an input neighbor graph on the basis of the K neighbor vertex sets of the respective vertices of a selected vertex set. More specifically, as an example, the neighbor graph updating unit 130 calculates the distances between the respective vertices of the selected vertex set in the input neighbor graph and other respective vertices containing an added new vertex to calculate a K neighbor vertex set. Then, the neighbor graph updating unit 130 combines together the K neighbor vertex set and K neighbor vertex sets (that have been already provided as the data of the neighbor graph) of respective vertices other than the selected vertex set in the input neighbor graph to reconstruct a K neighbor vertex set related to all the vertices of the input neighbor graph.

In S202, the neighbor graph updating unit 130 adds a K neighbor vertex set of the new vertex to the vertex set reconstructed in S201 to construct an approximate directed neighbor graph.

In S203, when the input neighbor graph is not a directed neighbor graph, the neighbor graph updating unit 130 reconstructs a neighbor graph having the same structure as that of the input neighbor graph on the basis of the approximate directed neighbor graph where necessary.

In S204, the neighbor graph updating unit 130 outputs a neighbor graph to which the new vertex has been added.

Note that when the neighbor graph updating unit 130 constructs an undirected K neighbor graph in S203, an approximate directed K neighbor graph is constructed until S202 and the directed K neighbor graph is made into an undirected K neighbor graph according to the definition of making an undirected state. The definition of making an invalid state represents a rule such as making a mutual edge into an undirected edge and providing an undirected edge when any of an out-going edge and an in-going edge exists.

Further, when the neighbor graph updating unit 130 constructs a degree-reduced K-nearest neighbor graph (K-DR graph) used in Non-Patent Literatures 1, 2, and 3 in S203, an existing K-DR graph construction algorithm is applied to the approximate directed K neighbor graph constructed until S202.

As described above, the neighbor graph updating unit 130 can construct various neighbor graphs by using the approximate directed neighbor graph that has been constructed in S202.

<Specific Example of Neighbor Graph Updating Unit 130>

Next, an example of a configuration and a processing content in a case in which the neighbor graph updating unit 130 constructs an approximate degree-reduced K-nearest neighbor graph will be described as a further specific example of the neighbor graph updating unit 130.

Figure 9:
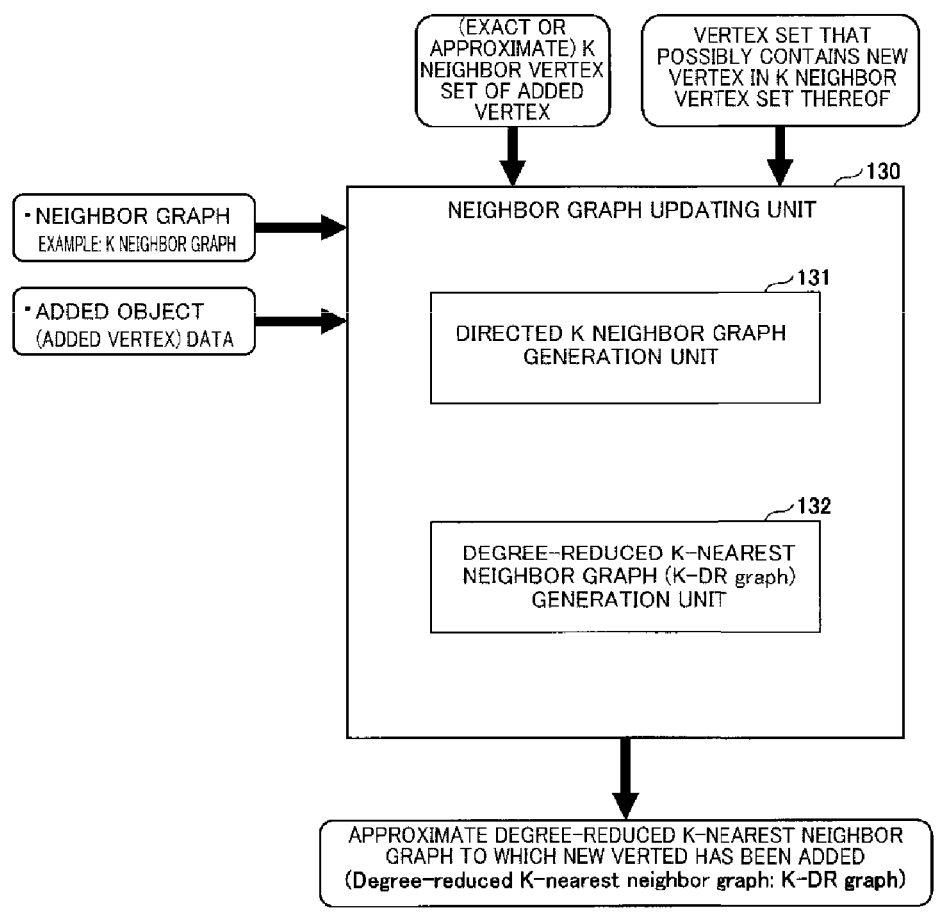
FIG. 9 is a diagram showing a function detail example of the neighbor graph updating unit 130.

FIG. 9 is a diagram showing the configuration of the neighbor graph updating unit 130 in a case in which the neighbor graph updating unit 130 constructs an approximate degree-reduced K-nearest neighbor graph. As shown in FIG. 9, input data is the same as that input to the neighbor graph updating unit 130 described above. In the case of FIG. 9, the neighbor graph updating unit 130 outputs an approximate degree-reduced K-nearest neighbor graph.

As shown in FIG. 9, the neighbor graph updating unit 130 has a directed K neighbor graph generation unit 131 and a degree-reduced K-nearest neighbor graph generation unit 132 (hereinafter called a K-DR graph generation unit 132). The operation of the neighbor graph updating unit 130 will be described with reference to the flowcharts of FIGS. 10 and 11.

Figure 10:
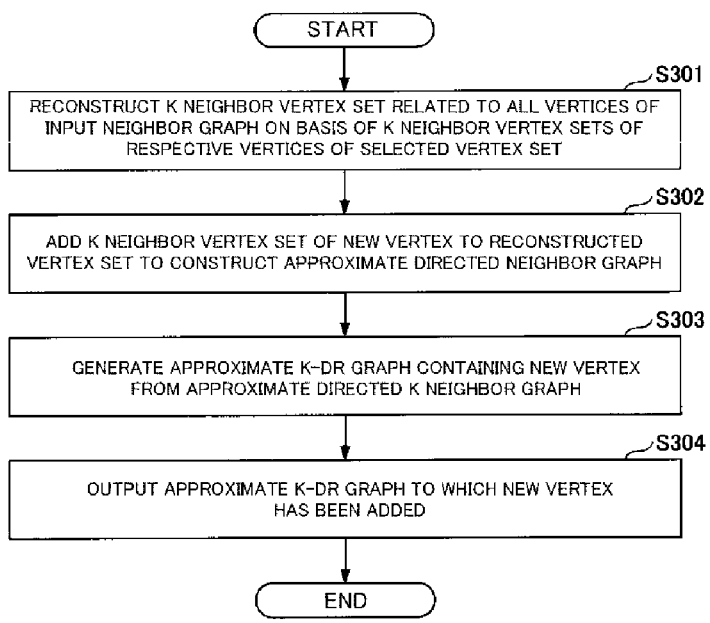
FIG. 10 is a flowchart for describing an operation example of the neighbor graph updating unit 130.

In S301 of FIG. 10, the directed K neighbor graph generation unit 131 reconstructs a K neighbor vertex set related to all the vertices of an input neighbor graph on the basis of K neighbor vertex sets of the respective vertices of a selected vertex set. More specifically, as an example, the directed K neighbor graph generation unit 131 calculates the distances between the respective vertices of the selected vertex set in the input neighbor graph and other respective vertices containing an added new vertex to calculate a K neighbor vertex set. Then, the neighbor graph updating unit 130 combines together the K neighbor vertex set and K neighbor vertex sets (that have been already provided as the data of the neighbor graph) of respective vertices other than the selected vertex set in the input neighbor graph to reconstruct a K neighbor vertex set related to all the vertices of the input neighbor graph. Here, among the vertices contained in the input neighbor graph, vertices containing the new vertex exist as the connecting destinations of an out-going edge.

In S302, the directed K neighbor graph generation unit 131 adds a K neighbor vertex set of the new vertex to the K neighbor vertex set related to all the vertices reconstructed in S301 to generate an approximate directed K neighbor graph (or an approximate directed K neighbor list).

In S303, the K-DR graph generation unit 132 applies an algorithm described in, for example, Non-Patent Literatures 1 and 2 using the approximate directed K neighbor graph (or the approximate directed K neighbor list) generated by the directed K neighbor graph generation unit 131 as input to generate an approximate K-DR graph to which the new vertex has been added.

In S304, the K-DR graph generation unit 132 outputs an approximate K-DR graph to which the new vertex has been added.

The approximate directed K neighbor list generated in S302 is a list in which K neighbor vertices are arranged side by side in ascending order of distance about the respective vertices. The approximate directed K neighbor list may be called an approximate directed K neighbor graph.

Figure 11:
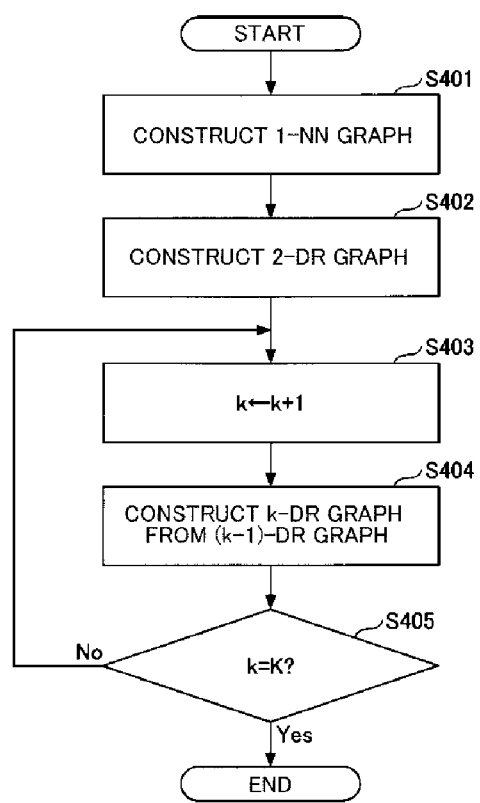
FIG. 11 is a diagram for describing a K-DR graph construction method.

A brief processing procedure in a case in which an approximate K-DR graph is generated with the application of the algorithm described in Non-Patent Literature 1 and 2 will be described with reference to the flowchart of FIG. 11.

In S401, the K-DR graph generation unit 132 provides the nearest neighbor vertex (vertex of k=1, $1 \leq k \leq K$) with an undirected edge among respective vertices using an approximate directed K neighbor list generated by the directed K neighbor graph generation unit 131 to construct a 1-NN graph k=2 is set.

In S402, the K-DR graph generation unit 132 regards the second-nearest vertex among respective vertices (called start points) as a vertex candidate that is to be provided with an edge. The K-DR graph generation unit 132 does not generate an undirected edge where it is possible to reach from the second-nearest vertex to a start point by tracing an existing edge toward a nearer vertex (that is, where it is possible to reach the start point according to a greedy search method). Only where it is not possible to reach from the second-nearest vertex to the start point, the graph generation unit 132 generates an undirected edge. By performing the operation on all the vertices, the graph generation unit 132 constructs a 2-DR graph.

In S403, the K-DR graph generation unit 132 changes k to k+1. In S404, a (k−1)-DR graph is constructed (a 2-DR graph is constructed at the beginning of repetition). The K-DR graph generation unit 132 regards the k-th-nearest vertex among the respective vertices as a vertex candidate that is to be provided with an edge. The K-DR graph generation unit 132 does not generate an undirected edge where it is possible to reach from the k-th-nearest vertex to a start point according to the greedy search method. Only where it is not possible to reach from the k-th-nearest vertex to the start point, the K-DR graph generation unit 132 generates an undirected edge between the start point and the k-th-nearest vertex. By performing the operation on all the vertices, the graph generation unit 132 constructs a k-DR graph.

The K-DR graph generation unit 132 repeatedly performs the processing of S403 and S404 until k=K is established (S405). The K-DR graph generation unit 132 ends the processing when k=K is established in S405.

(Case in which Dissimilarity or the Like is Used as Scale of Relationship)

The above description refers to a case in which a distance is used as the scale of the relationship between two vertices. There are also many cases in which dissimilarity such as divergence that does not satisfy a distance axiom is used. In such cases, a scaling factor ($\alpha>0$) that is a positive number is introduced into a filter. Particularly, conditions for determining the first filter and the third filter by the vertex selection unit 120 are set as follows according to the introduction of the scaling factor.

Where a vertex is excluded by the first filter:

$$\mathrm{dist}(v_q, v_x) > \mathrm{max\_dist} \times \alpha_1$$

Where a vertex is excluded by the third filter:

$$LB(v_q, v_x) \geq \mathrm{max\_dist} \times \alpha_3$$

Among the respective filters, $\alpha$ may be different and is not necessarily required to be the same. That is, $\alpha_1$ and $\alpha_3$ may be the same or different from each other in the above example.

(Evaluation Results)

An experiment was conducted using the neighbor graph updating device 100 described in the present embodiment.

In the experiment, the data of the MNIST database of handwritten digit image was used.

(http://yann.lecun.com/exdb/mnist/, Y.LeCun, L.Bottou, Y.Bengio, and P.Haffner., "Gradient-based learning applied to document recognition." Proceedings of the IEEE, 86(11):2278-2324, November 1998)

Target data, the scale of a relationship, an input graph, an added vertex, a calculator used as the neighbor graph updating device 100, and an evaluation method are as follows.

Target data: 60,000 feature vectors (784 dimensions) extracted from each of 60,000 images, handled as points on a hypersphere Distance: Euclidean distance Input graph: K-DR graph (K=20, 40, 60, 80, 100)

Added vertex: 20 feature vectors (points on a hypersphere) not contained in target data Calculator: Intel Xeon E5-2697v3 2.6 GHz, single thread executed.

Evaluation method 1: The ratio of an average time required by an inventive method to an average time required by a reference method, which was obtained when a method for updating K neighbor vertices of all vertices at the time of adding one vertex was assumed as the reference method and an average time required to add each of 20 vertices was calculated according to the reference method and the inventive method (method using the present invention).

Figure 12:
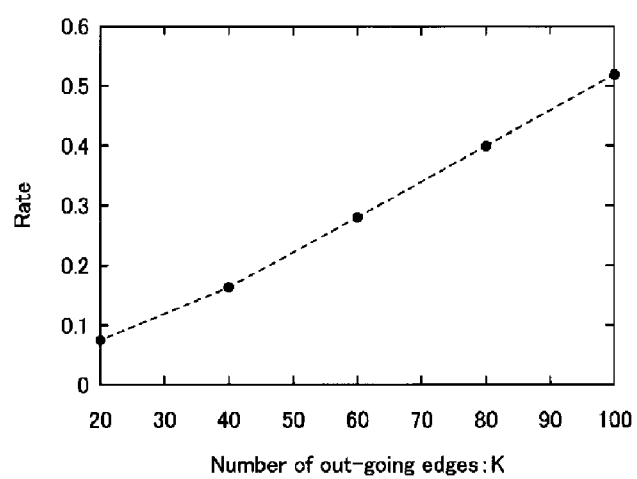
FIG. 12 is a diagram showing speed performance in a case in which an approximate K-DR graph is updated.

FIG. 12 is a diagram showing evaluation results according to the above experiment. That is, FIG. 12 is a diagram expressing results obtained when speed performance for updating an approximate K-DR graph was evaluated by the experiment.

As shown in FIG. 12, the inventive method is 10 times or more faster than the reference method when K is 20, and is about twice faster than the reference method even when K is 100. Like this, it seems that time complexity for adding a new vertex to a neighbor graph can be remarkably reduced by the technology according to the present invention.

Effect of Embodiment

The K neighbor vertex search unit 110 of the neighbor graph updating device 100 according to the present embodiment performs a graph index type search and therefore experimentally has time complexity of O(log n). The vertex selection unit 120 has time complexity of O(1) since a filtering function is not directly related to the number of vertices. Accordingly, it is possible to add a vertex to a neighbor graph with extremely small time complexity of O(log n) and update the neighbor graph.

Further, about K that can be a variable related to time complexity other than the number n of target data, a vertex addition processing time was calculated by an experiment using K as a variable. As a result, the vertex addition processing time was calculated faster than the reference method within the practical applicable range of the number K of out-going edges.

Summary of Embodiment

As described above, a graph updating device including a K neighbor vertex search unit, a vertex selection unit, and a neighbor graph updating unit are provided according to the present embodiment. The K neighbor vertex search unit searches for a K neighbor vertex set of an added vertex in a neighbor graph on the basis of the neighbor graph and an object added to the neighbor graph as an added vertex and outputs the K neighbor vertex set. The vertex selection unit selects a vertex candidate set on the basis of the neighbor graph, the added vertex, and the K neighbor vertex set of the added vertex and outputs the vertex candidate set, the vertex candidate set being a set of vertices that is present in the neighbor graph and possibly contains the added vertex in a K neighbor vertex set thereof. The neighbor graph updating unit reconstructs a K neighbor vertex set related to all vertices of the neighbor graph using K neighbor vertex sets of respective vertices of the vertex candidate set and adds the K neighbor vertex set of the added vertex to the reconstructed K neighbor vertex set to generate an updated neighbor graph.

The vertex selection unit selects the vertex candidate set by applying, for example, a filter for excluding a vertex that does not regard the added vertex as a K neighbor vertex thereof from a set of vertices of the neighbor graph.

The neighbor graph updating unit may generate an approximate degree-reduced K-nearest neighbor graph as the updated neighbor graph.

Further, a program for causing a computer to function as each of the units of the graph updating device described above is provided according to the present embodiment.

The present embodiment is described above. However, the present invention is not limited to the specific embodiment, and various deformations or modifications are made possible within the range of the spirit of the present invention described in claims.

REFERENCE SIGNS LIST 100 neighbor graph updating device
110 K neighbor vertex search unit
120 vertex selection unit
130 neighbor graph updating unit
131 directed K neighbor graph generation unit
132 degree-reduced K-nearest neighbor graph generation unit
1000 drive device
1001 recording medium
1002 auxiliary storage device
1003 memory device
1004 CPU
1005 interface device
1006 display device
1007 input device

The invention claimed is:

1. A computer-implemented method for processing aspects of a neighbor graph, the method comprising:
   receiving the neighbor graph, wherein the neighbor graph includes a plurality of vertices and a plurality of connections among the plurality of vertices, and wherein each connection is based on a relationship between a pair of vertices in the plurality of vertices;
   receiving a vertex for adding in the neighbor graph as an additional vertex;
   identifying, based on the received additional vertex, a first set of K-neighbor vertices, wherein the K-neighbor vertices include a predetermined number of vertices based on distances of respective vertices from the received additional vertex;
   generating a set of candidate vertices,
      wherein the set of candidate vertices is based at least on a combination of:
         the received neighbor graph,
         the received additional vertex, and
         the first set of K-neighbor vertices, and
      wherein the set of candidate vertices includes a vertex of a second set of K-neighbor vertices likely including the additional vertex;
   updating, using sets of K-neighbor vertices associated with respective vertices of the set of candidate vertices, a third set of K-neighbor vertices, wherein the third set of K-neighbor vertices relates to all vertices of the neighbor graph;
   updating the neighbor graph, wherein the update of the neighbor graph is based at least on a combination of the first set of K-neighbor vertices representing K-neighbor vertices of the additional vertex and the updated third set of K-neighbor vertices; and
   providing the updated neighbor graph.

2. The computer-implemented method of claim 1, the method further comprising:
   generating the set of candidate vertex using a filter, wherein the filter is configured to remove a set of vertices from the plurality of neighbor vertices in the neighbor graph, wherein each vertex in the set of vertices exclude the additional vertex as a K-neighbor vertex of the each vertex.

3. The computer-implemented method of claim 1, wherein the updated neighbor graph includes an approximate degree-reduced K-nearest neighbor graph.

4. The computer-implemented method of claim 1, wherein the set of candidate vertices includes a less number of vertices than the plurality of vertices in the neighbor graph.

5. The computer-implemented method of claim 1, wherein the first set of K-neighbor vertices represents K-neighbor vertices of the additional vertex.

6. The computer-implemented method of claim 1, wherein the neighbor graph is based at least on a distance of a relationship between a pair of neighbor vertices in the plurality of neighbor vertices.

7. The computer-implemented method of claim 1, the method further comprising:

generating, based on the updated neighbor graph, a trained machine learning model;
receiving input data;
generating, based on the trained machine learning model, output data; and
providing the output data.

8. A system for processing aspects of a neighbor graph, the system comprises:
a processor; and
a memory storing computer-executable instructions that when executed by the processor cause the system to:
receive the neighbor graph, wherein the neighbor graph includes a plurality of vertices and a plurality of connections among the plurality of vertices, and wherein each connection is based on a relationship between a pair of vertices in the plurality of vertices;
receive a vertex for adding in the neighbor graph as an additional vertex;
identify, based on the received additional vertex, a first set of K-neighbor vertices, wherein the K-neighbor vertices include a predetermined number of vertices based on distances of respective vertices from the received additional vertex;
generate a set of candidate vertices,
wherein the set of candidate vertices is based at least on a combination of:
the received neighbor graph,
the received additional vertex, and
the first set of K-neighbor vertices, and
wherein the set of candidate vertices includes a vertex of a second set of K-neighbor vertices likely including the additional vertex;
update, using sets of K-neighbor vertices associated with respective vertices of the set of candidate vertices, a third set of K-neighbor vertices, wherein the third set of K-neighbor vertices relates to all vertices of the neighbor graph;
update the neighbor graph, wherein the update of the neighbor graph is based at least on a combination of the first set of K-neighbor vertices representing K-neighbor vertices of the additional vertex and the updated third set of K-neighbor vertices; and
provide the updated neighbor graph.

9. The system of claim 8, the computer-executable instructions when executed further causing the system to:
generate the set of candidate vertex using a filter, wherein the filter is configured to remove a set of vertices from the plurality of neighbor vertices in the neighbor graph, wherein each vertex in the set of vertices exclude the additional vertex as a K-neighbor vertex of the each vertex.

10. The system of claim 8, wherein the updated neighbor graph includes an approximate degree-reduced K-nearest neighbor graph.

11. The system of claim 8, wherein the set of candidate vertices includes a less number of vertices than the plurality of vertices in the neighbor graph.

12. The system of claim 8, wherein the first set of K-neighbor vertices represents K-neighbor vertices of the additional vertex.

13. The system of claim 8, wherein the neighbor graph is based at least on a distance of a relationship between a pair of neighbor vertices in the plurality of vertices.

14. The system of claim 8, the computer-executable instructions when executed further causing the system to:
generate, based on the updated neighbor graph, a trained machine learning model;
receive input data;
generate, based on the trained machine learning model, output data; and
provide the output data.

15. A computer-readable non-transitory recording medium storing computer-executable instructions that when executed by a processor cause a computer system to:
receive the neighbor graph, wherein the neighbor graph includes a plurality of vertices and a plurality of connections among the plurality of vertices, and wherein each connection is based on a relationship between a pair of vertices in the plurality of vertices;
receive a vertex for adding in the neighbor graph as an additional vertex;
identify, based on the received additional vertex, a first set of K-neighbor vertices, wherein the K-neighbor vertices include a predetermined number of vertices based on distances of respective vertices from the received additional vertex;
generate a set of candidate vertices,
wherein the set of candidate vertices is based at least on a combination of:
the received neighbor graph,
the received additional vertex, and
the first set of K-neighbor vertices, and
wherein the set of candidate vertices includes a vertex of a second set of K-neighbor vertices likely including the additional vertex;
update, using sets of K-neighbor vertices associated with respective vertices of the set of candidate vertices, a third set of K-neighbor vertices, wherein the third set of K-neighbor vertices relates to all vertices of the neighbor graph;
update the neighbor graph, wherein the update of the neighbor graph is based at least on a combination of the first set of K-neighbor vertices representing K-neighbor vertices of the additional vertex and the updated third set of K-neighbor vertices; and
provide the updated neighbor graph.

16. The computer-readable non-transitory recording medium of claim 15, the computer-executable instructions when executed further causing the system to:
generate the set of candidate vertex using a filter, wherein the filter is configured to remove a set of vertices from the plurality of neighbor vertices in the neighbor graph, wherein each vertex in the set of vertices exclude the additional vertex as a K-neighbor vertex of the each vertex.

17. The computer-readable non-transitory recording medium of claim 15, wherein the updated neighbor graph includes an approximate degree-reduced K-nearest neighbor graph.

18. The computer-readable non-transitory recording medium of claim 15, wherein the set of candidate vertices includes a less number of vertices than the plurality of vertices in the neighbor graph.

19. The computer-readable non-transitory recording medium of claim 15, wherein the first set of K-neighbor vertices represents K-neighbor vertices of the additional vertex.

20. The computer-readable non-transitory recording medium of claim 15, the computer-executable instructions when executed further causing the system to:
generate, based on the updated neighbor graph, a trained machine learning model;
receive input data;

generate, based on the trained machine learning model, output data; and
provide the output data.

\* \* \* \* \*